United States Patent [19]
Beutler et al.

[11] Patent Number: 5,832,080
[45] Date of Patent: *Nov. 3, 1998

[54] METHOD AND APPARATUS FOR ROUTING CONDUCTORS THROUGH A HINGE

[75] Inventors: Scott David Beutler, Barrington; Brian Jon Hassemer, Gurnee, both of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 780,662

[22] Filed: Jan. 7, 1997

Related U.S. Application Data

[63] Continuation of Ser. No. 437,344, May 9, 1995, abandoned.

[51] Int. Cl.$^6$ .............................. H04M 1/00; E05C 17/64
[52] U.S. Cl. ............................. 379/433; 379/434; 16/342
[58] Field of Search ..................................... 379/433, 434, 379/428; 485/90, 575, 128; 16/342; 361/724, 726, 638, 679, 680, 681, 682, 683; D14/137, 138, 145, 240, 248, 249

[56] References Cited

U.S. PATENT DOCUMENTS

| | | |
|---|---|---|
| 4,471,493 | 9/1984 | Schober . |
| 4,802,605 | 2/1989 | Salmon et al. . |
| 4,825,395 | 4/1989 | Kinser, Jr. et al. . |
| 4,864,523 | 9/1989 | Sasaki ..................................... 361/680 |
| 4,897,873 | 1/1990 | Beutler et al. . |
| 4,959,887 | 10/1990 | Gruenberg et al. . |
| 5,014,346 | 5/1991 | Phillips et al. . |
| 5,027,394 | 6/1991 | Ono et al. . |
| 5,141,446 | 8/1992 | Ozouf et al. . |
| 5,170,173 | 12/1992 | Krenz et al. . |
| 5,260,998 | 11/1993 | Takagi . |
| 5,335,273 | 8/1994 | Takagi et al. . |
| 5,394,297 | 2/1995 | Toedter . |
| 8,148,710 | 11/1993 | Rush et al. . |

FOREIGN PATENT DOCUMENTS

| | | | |
|---|---|---|---|
| 135960 | 8/1984 | Japan | ...................................... 379/428 |
| 59-135959 | 8/1984 | Japan | ...................................... 379/433 |
| 2295850 | 6/1996 | United Kingdom . | |

*Primary Examiner*—Jack Chiang
*Attorney, Agent, or Firm*—John J. King

[57] ABSTRACT

A unique method and apparatus effectively routes conductors such as conductors on a flex strip (402) through a hinge of a foldable electronic device (100) such portable cellular radiotelephone or some other wireless communication device. In particular, a cylinder (118) is rotatably mounted within the hinge portion of a housing (104). The cylinder preferably includes a slot for receiving a distal end portion (414) of the flex strip which is also inserted into a slot (310) in the other housing (102) of the foldable electronic device. The method and apparatus of the present invention enables the flex strip to be routed between the two moveable housings and the housing elements to move with respect to one another without being damaged.

16 Claims, 4 Drawing Sheets

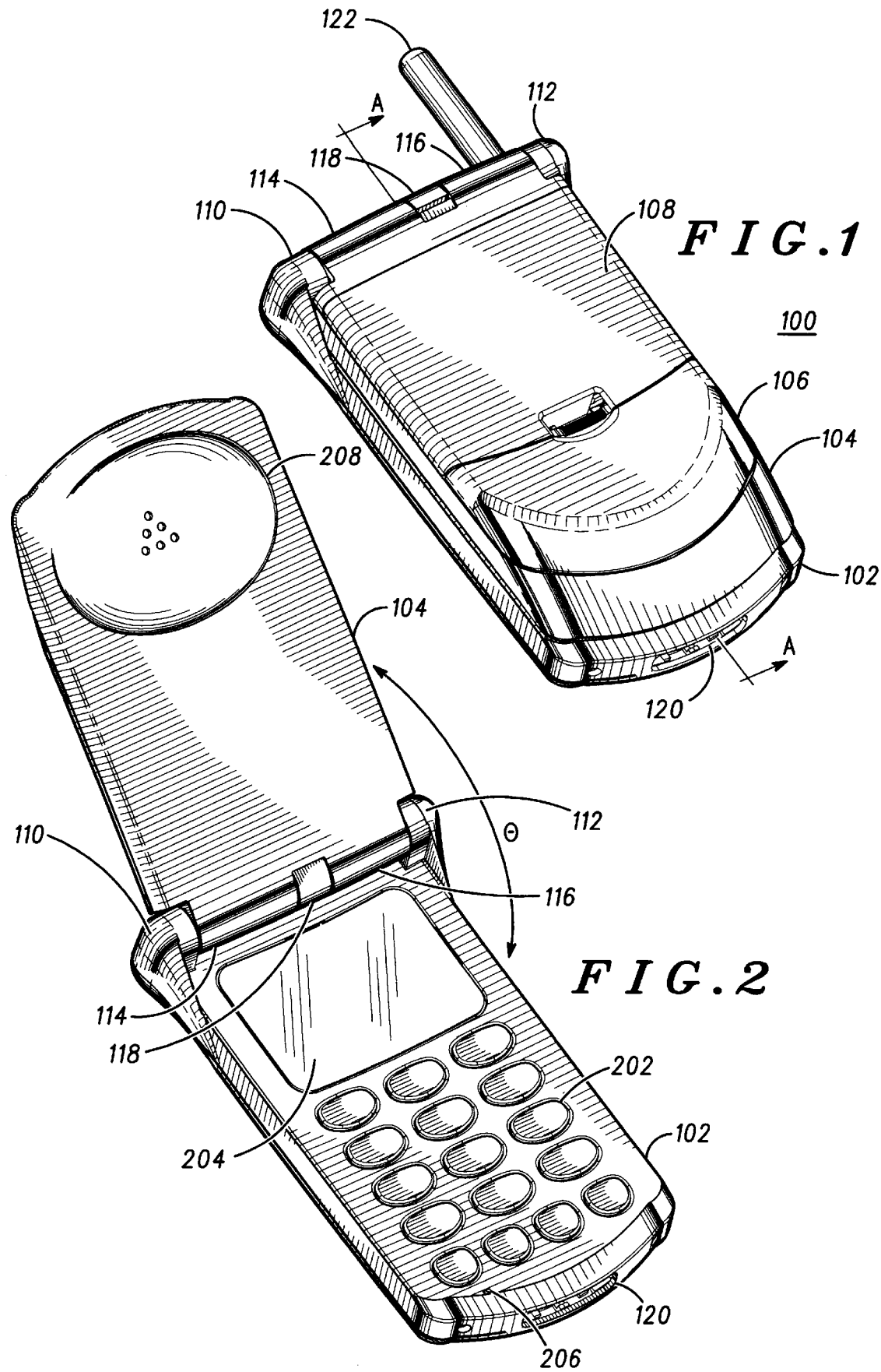

METHOD AND APPARATUS FOR ROUTING CONDUCTORS THROUGH A HINGE

This is a continuation of application Ser. No. 08/437,344, filed May 9, 1995 and now abandoned.

FIELD OF THE INVENTION

The present invention is generally related to electronic devices, and more particularly to a method and apparatus for routing conductors through a hinge of an electronic device.

BACKGROUND OF THE INVENTION

With improvements in technology and the decrease in size of electronic components, electronic devices have similarly decreased in size. One technique for further reducing the overall dimensions of an electronic device is to provide hinged portions which can be folded. Many electronic devices which include hinged covers have little functionality. For example, some have no functionality other than to protect an interface for the device, or have limited functionality related to the position of the cover.

However, functional components can be included in both hinged portions. In addition to reducing the overall dimensions, the hinged arrangement allows for additional functional surface area to be exposed when the electronic device is opened and protected when the electronic device is closed. For example, in a portable radiotelephone or other electronic devices such as laptop computer, palmtop computer or electronic organizer, the inner surface of one hinged portion could contain function elements such as an earpiece and display, while the inner surface of the other hinged portion could contain another functional element such as a keypad.

However, when functional elements are located in each of the hinged portions, an electrical connection must be made between the functional elements. Such an electrical connection can be made by routing individual wires through the hinge. Alternatively, flex strips commonly known by those skilled in the art can be routed between the hinged portions to provide the electrical connection through the functional elements of the hinged portions.

In conventional devices having flex strips routed through the hinge, an excess length of flex strip has been provided within the hinge to allow for the additional length of flex strip required when the device is closed. For example, a flex strip may be loosely wound around a shaft of a hinge. When the electronic device is in a closed position, the flex strip fits more securely around the hinge. Other devices have provided rotatable elements which move freely within a hinge and have a flex strip which extends through a slot in the rotatable element of the hinge. Finally, electronic devices having no rotatable element within the hinge have incorporated flex strips which extend along an extended hinge and twist within the hinge. The stress on the connections at proximal and distal end portions of the flex strip is minimized by spreading the torsion on the flex strip over a greater length. However, such conventional devices generally require excess flex strip and/or hinges having a greater diameter to house the excess flex strip. Such arrangements are also susceptible to damage or failure over time due to pinching of the flex strip or stresses on the connections.

Accordingly, there is a need for a hinge arrangement for a foldable electronic device incorporating a conductor and a rotatably mounted cylinder within the hinge which does not require an excess length of flex strip. There is a further need for a foldable electronic device having a flex strip and rotatably mounted cylinder which minimizes damage to the flex strip.

BRIEF DESCRIPTION OF THE DRAWINGS

FIG. 1 is a perspective view of a foldable electronic device in the closed position incorporating the present invention;

FIG. 2 is a perspective view of the foldable electronic device of FIG. 1 in the open position;

DESCRIPTION OF THE PREFERRED EMBODIMENT

Figure 3:
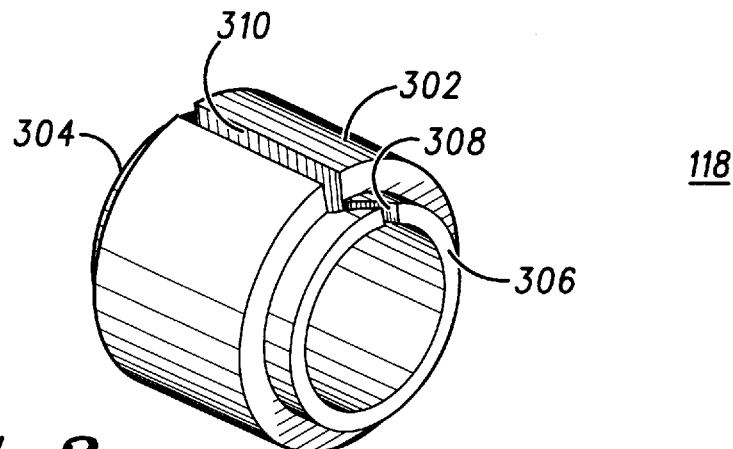
FIG. 3 is a perspective view of a cylinder for routing conductors through a hinge in a foldable electronic device according to the present invention.

The present invention is directed to a method and apparatus for routing conductors such as conductors on a flex strip through a hinge of a foldable electronic device such as a portable cellular radiotelephone or other wireless communication device. In particular, the invention provides a cylinder which is rotatably mounted within the hinge portion of a housing element. The cylinder preferably includes a slot for receiving a distal end of a flex strip which is also inserted into a slot in another housing element of the foldable electronic device. The method and apparatus of the present invention enables the flex strip to be effectively routed between the two moveable housing elements without being damaged.

Turning first to FIG. 1, a perspective view shows a foldable electronic device 100 such as a portable cellular radiotelephone having two hinged portions in the closed position. In particular, a lower housing 102 is coupled to an upper housing 104 having an outer housing cover 106 and a detachable battery 108. Lower housing 102 includes hinge elements 110 and 112 which intercouple with hinge elements 114 and 116 of upper housing 104. A cylinder 118 for routing conductors between lower housing 102 and upper housing 104 is positioned within upper housing 104 between hinge elements 114 and 116. Lower housing 102 preferably includes an external connector 120 for transmitting or receiving signals from an external device and an antenna 122 for transmitting or receiving radio frequency (RF) signals.

As shown in FIG. 2, the foldable electronic device can be opened to an angle theta (θ), exposing the keypad 202, display 204, microphone aperture 206, and speaker 208. As will become apparent in the remaining figures, cylinder 118 enables conductors, such as conductors on a flex strip, to make a connection between electrical components located in the upper housing and the lower housing.

Turning now to FIG. 3, an exemplary cylinder 118 according to the present invention is shown. Cylinder 118 preferably comprises a main cylinder portion 302 and outer cylinder portions 304 and 306. Outer cylinder portion 306 includes a slot 308 leading to a slot 310 in main cylinder portion 302. Slot 308 is preferably positioned at an angle with respect to the longitudinal axis of the cylinder to prevent a conductor such as a flex strip which may be inserted in slot 310 from sliding out during assembly of the electronic device. However, it will be understood that slot 308 could be collinear with slot 310. Also, the slot comprising slots 308 and 310 could extend through outer cylinder portion 304. Although the cylinder is shown as a hollow cylinder, the cylinder could be substantially solid with slots 308 and 310 extending from the center of the cylinder laterally toward the outer surface. However, the cylinder is preferably hollow as shown to reduce the overall weight of the foldable electronic device.

Figure 4:
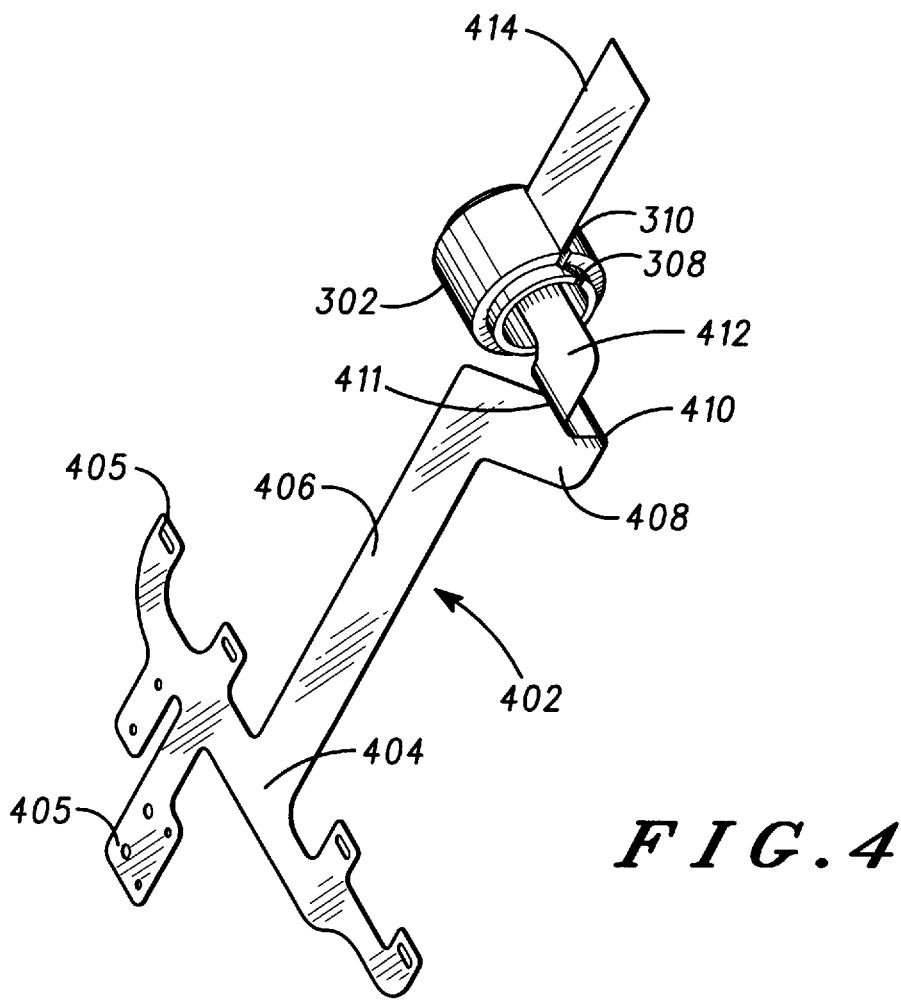
FIG. 4 is a perspective view of a flex strip inserted in the cylinder of FIG. 3.

Turning now to FIG. 4, a flex strip 402 is shown positioned within slot 310 of cylinder 118. While flex strip 402 is shown as a flex strip having conductive elements as is well known in the art, any type of conductive element including one or more individual wires could be employed according to the present invention. Preferably, flex strip 402 comprises a proximal end portion 404 having contact elements 405 for making connections to components in upper housing 104 of the electronic device. A lead portion 406 of the flex strip leads to an angled portion 408. As will become apparent in FIG. 6, lead portion 406 will lie adjacent to lower housing 102, requiring an elbow portion 410 to enable a lateral portion 412 of the flex strip to extend into cylinder 118, and a distal end portion 414 of the flex strip to extend through slot 310.

Figure 6:
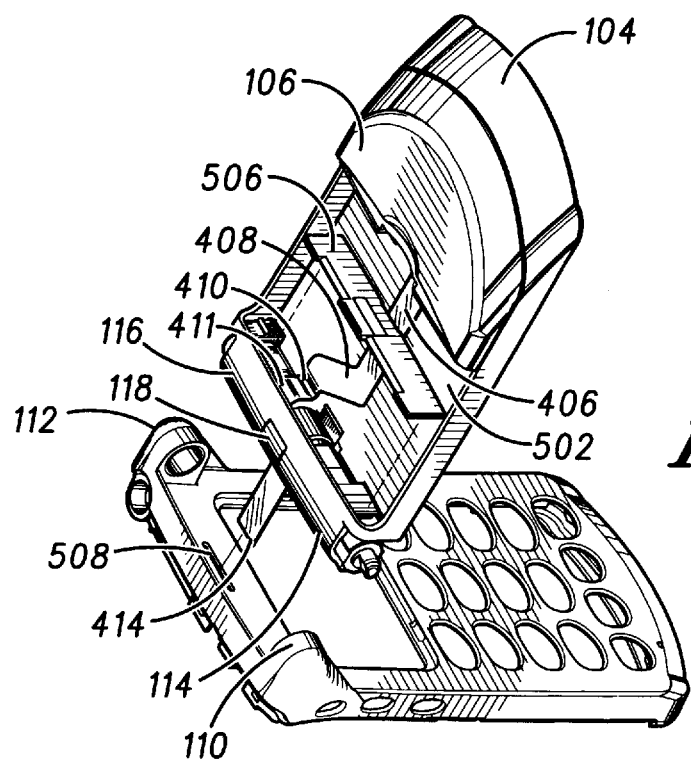
FIG. 6 is a perspective view of the housing assemblies of FIG. 5 having the cylinder and flex strip inserted in the upper housing.

Flex strip 402 of FIG. 4 is shown in a conformal position when inserted in the electronic device, as shown in FIG. 6. While the flex strip is preferably a conventional flex strip which lies flat when standing alone, it will be understood that flex strip 402 could be pre-formed to have elbow portion 410 as shown in FIG. 4. Further, while lead portion 406 and distal end portion 414 are collinear in FIG. 4, lead portion 406 could extend down from elbow portion 410 without the angled portion 408 and could terminate in any arrangement of contact elements 405.

Figure 5:
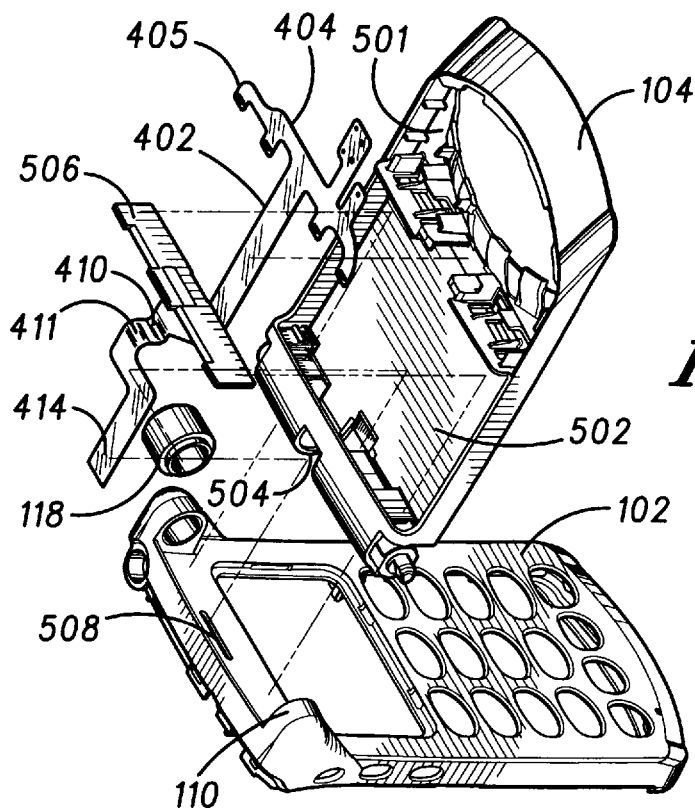
FIG. 5. is an exploded view of the housing assemblies of the foldable electronic device of FIG. 1 incorporating the flex strip and cylinder of FIG. 4.

Turning now to FIGS. 5 and 6, exploded views of the housings incorporating cylinder 118 and flex strip 402 are shown. In particular, contact elements 405 of proximal end portion 404 are adapted to provide an electrical connection to components within a component housing portion 501. Such components mounted within the housing could include circuit boards and/or discrete components such as a vibrator for a silent alert function, a speaker, an audio alert device or battery contacts.

Cylinder 118 is adapted to be inserted within an aperture 504 between hinge elements 114 and 116. In particular, main cylinder portion 302 of the cylinder is adapted to be flush with hinge elements 114 and 116, while outer cylinder portions 304 and 306 fit within hinge elements 114 and 116, allowing cylinder 118 to rotate within aperture 504. Preferably, aperture 504 extends an angle greater than 180 degrees around the hinge to allow a full range of motion of the hinged portions. Although the hinge may be designed to open to a fixed angle θ as shown in FIG. 2, the hinge may also allow for over-extension to minimize damage to the device. As will become apparent in reference to FIGS. 7–9, cylinder 118 will only rotate through the angle of aperture 504 when distal end portion 414 of the flex strip is positioned through slot 310 of cylinder 118. Accordingly, any angle of aperture 504 which will limit the range of motion of the hinged elements can be selected.

As can be seen in FIG. 6, elbow portion 410 and elbow portion 411 allow lateral portion 412 to be inserted into the center portion of the cylinder and distal end portion 414 to extend through slot 310. Finally, a cover 506 can be inserted to prevent any exposure of the flex strip or cylinder. In the fully assembled electronic device, outer housing cover 106 covers the components in component housing portion 501. Lead portion 406 is adapted to lie on a flat surface 502 of upper housing 104 and may be covered by a housing portion, a label or other material to prevent damage to the flex strip. Battery 108 show in FIG. 1 is generally positioned over flex strip 402.

Figure 7:
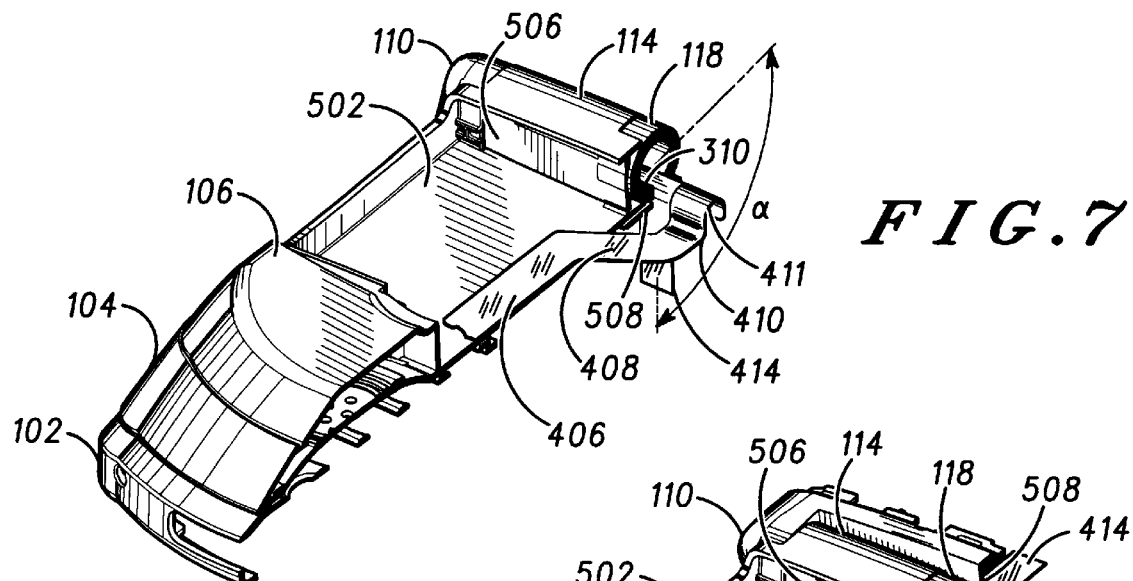
FIG. 7 is a partial cross sectional view showing the positioning of the flex strip and cylinder within the housing elements when the portable electronic device is in the closed position.
Figure 8:
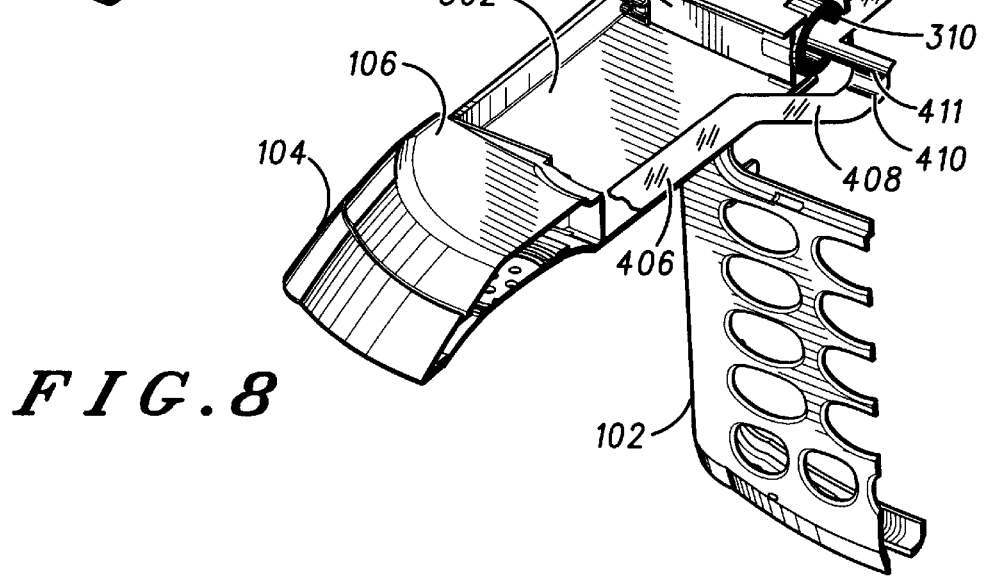
FIG. 8 is a partial cross sectional view showing the positioning of the flex strip and the cylinder within the housing elements when the portable electronic device is opened to a 90 degree angle.
Figure 9:
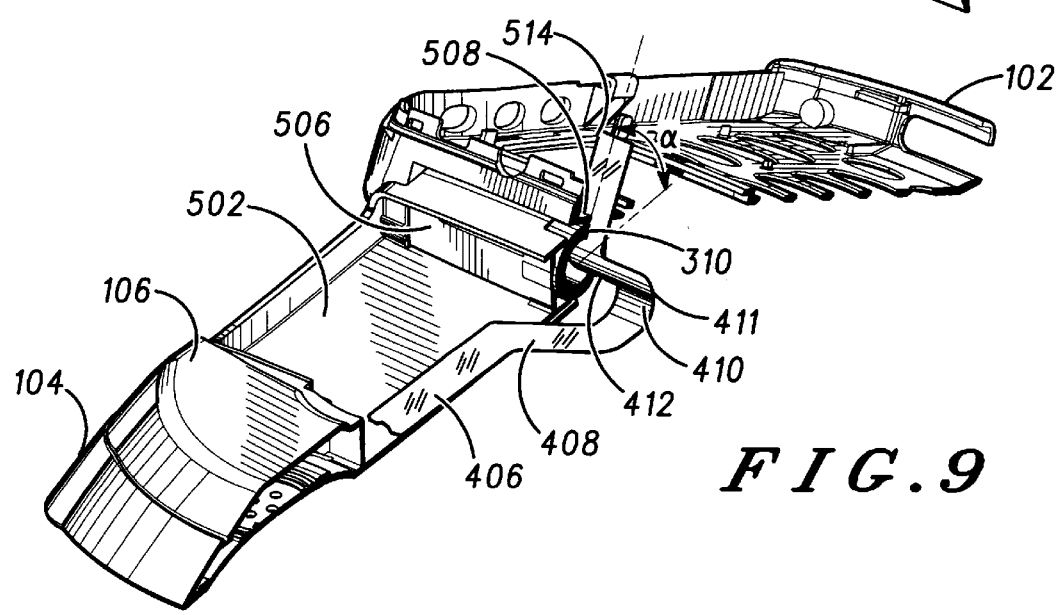
FIG. 9 is a partial cross sectional view showing the positioning of the flex strip and the cylinder within the housing elements when the portable electronic device is fully open.

Turning now to FIGS. 7–9, partial cross sectional views of the foldable electronic device taken at lines A—A of FIG. 1 show the motion of the flex strip 402 and cylinder 118. To clearly show the movement of the flex strip, the flex strip is not eliminated in the cross sectional views. Rather, the entire flex strip is shown throughout FIGS. 7–9. To clearly describe the movement of the flex strip and the cylinder, an angle alpha ($\alpha$) is defined as the angle between distal end portion 414 and the plane containing lead portion 406 as shown in FIG. 7. When the electronic device is in the closed position as shown in FIG. 7, angle $\alpha$ is approximately minus ninety (–90) degrees. In this position, elbow portion 411 of the flex strip is bent in a clockwise direction as shown in FIG. 7 to allow distal end portion 414 of the flex strip to extend through slot 310 of cylinder 118 and slot 508 of lower housing 102.

As lower housing 102 is moved with respect to upper housing 104, both cylinder 118 and distal end portion 414 which extends through slot 508 of lower housing 102 move with lower housing 102. That is, slot 310 of the cylinder and slot 508 of lower housing 102 remain aligned as the upper and lower housings move with respect to one another. When lower housing 102 and upper housing are at 90 degrees as shown in FIG. 8, angle $\alpha$ is at 0 degrees as the distal end portion 414 is coplanar with lead portion 406 of the flex strip. As can be seen in FIG. 8, the degree of curvature of elbow portion 411 is reduced. As the electronic device is further opened to an angle equal to the angle θ shown in FIG. 2, angle $\alpha$ extends to a positive angle. As can be seen in FIG. 9, the rotation of elbow portion 411 is even further reduced as cylinder 118 and distal end portion 414 rotate with lower housing 102.

Although the invention has been described and illustrated in the above description and drawings, it is understood that this description is by way of example only and that numerous changes and modifications can be made by those skilled in the art without departing from the true spirit and scope of the invention. Although the drawings show a pre-formed flex strip, the present invention could employ any shape flex strip or other conductive elements to provide an electrical connection between components in the moveable housing elements. The references to upper and lower housing portions are arbitrarily selected and the moveable cylinder could be incorporated in either housing element. Also, instead of an aperture in the housing, the cylinder could be moveably inserted in a gap in the housing to allow a full 360 degree rotation of the housing elements with respect to one another. Although the present invention finds particular application in portable cellular radiotelephones, the invention could be applied to any electronic device, including pagers, electronic organizers, computers or any wireless communication device having moveable housing elements. Applicants' invention should be limited only by the following claims.

We claim:

1. A hinge for routing a conductor in an electronic device comprising:
   a first hinge element having an aperture providing an opening to a first portion of said electronic device for receiving said conductor;
   a cylinder movably positioned within said aperture of said first hinge element, said cylinder having a main cylinder portion and outer cylinder portions on each side of said main cylinder portion and having a first slot extending at least partially therethrough for receiving said conductor wherein said first slot has a first portion extending through one of said outer cylinder portions at an angle with respect to a second portion extending though said main cylinder portion; and
   a second hinge element having a second slot for receiving said conductor, said conductor retaining said cylinder in a substantially fixed position relative to said second hinge element.

2. The hinge of claim 1 wherein said first hinge element and said second hinge element form first and second housing portions respectively of a wireless communication device.

3. A hinge apparatus for a foldable electronic device comprising:
   a first hinge portion having an aperture;
   a cylinder movably positioned within said aperture, said cylinder having a main cylinder portion and outer cylinder portions on each side of said main cylinder portion and having a first slot, said first slot having a first portion extending through one of said outer cylinder portions at an angle with respect to a second portion extending at least partially though said main cylinder portion;
   a flex strip having a first portion extending longitudinally into said cylinder and having a second portion extending laterally through said first slot and said aperture; and
   a second hinge portion having a second slot for receiving said second portion of said flex strip, said flex strip retaining said cylinder in a substantially fixed position relative to said second hinge portion.

4. A hinge integrally associated with moveable housing portions of a wireless communications device for routing a flex strip between said moveable housing portions, said hinge comprising:
   a first housing portion forming a first portion of said hinge, said first housing portion having an aperture formed in said hinge;
   a cylinder rotatably positioned within said aperture of said first housing portion, said cylinder having a main cylinder portion and outer cylinder portions on each side of said main cylinder portion and having a first slot extending longitudinally through at least a portion of said cylinder wherein said first slot has a first portion extending through one of said outer cylinder portions at an angle with respect to a second portion extending though said main cylinder portion;
   a flex strip having a first portion extending longitudinally into said cylinder and having a second portion extending laterally through said first slot and said aperture; and
   a second housing portion forming a second portion of said hinge and having a second slot for receiving said second portion of said flex strip, said second portion of said flex strip retaining said cylinder in a substantially fixed position relative to said second housing portion.

5. A moveable housing assembly for a portable radiotelephone for routing a flex strip between hinged portions of said portable radiotelephone, said moveable housing assembly comprising:
   a first housing portion forming a first portion of a hinge and having an aperture;
   a cylinder rotatably positioned within said first housing portion at said aperture, said cylinder comprising a main cylinder portion and outer cylinder portions on each side of said main cylinder portion and having a slot extending longitudinally through one of said outer cylinder portions and said main cylinder portion at an angle with respect to a second portion extending though said main cylinder portion;
   a flex strip having a first portion extending longitudinally in said cylinder and having a second portion extending laterally through said slot; and
   a second housing portion forming a second portion of said hinge and having a slot for receiving said second portion of said flex strip, said second portion of said flex strip retaining said cylinder in a substantially fixed position relative to said second housing portion.

6. A method for routing a conductor between moveable housing elements, said method comprising the steps of:
   providing a hinge comprising a first hinge portion having an aperture and a second hinge portion having a first slot for receiving said conductor;
   providing a cylinder having a main cylinder portion and outer cylinder portions on each side of said main cylinder portion and having a second slot extending at least partially therethrough for receiving said conductor, said second slot having a first portion extending through one of said outer cylinder portions and said main cylinder portion at an angle with respect to a second portion extending though said main cylinder portion;
   positioning said cylinder moveably within said aperture of said first hinge portion;
   inserting said conductor longitudinally into said cylinder;
   extending said conductor laterally through said second slot and said first slot; and
   retaining said cylinder in a substantially fixed position relative to said second hinge portion with said conductor.

7. The method for routing conductors of claim 6 wherein said step of positioning a cylinder comprises positioning said main cylinder portion within said aperture and positioning said outer cylinder portions on each side of said main cylinder portion within said hinge.

8. The method for routing conductors of claim 7 wherein said step of extending said conductor comprises positioning said conductor within a hollow region of said cylinder.

9. The method for routing conductors of claim 8 wherein said step of extending said conductor laterally through said second slot and said first slot comprises aligning said second slot and said first slot.

10. A method for routing a flex strip between moveable housing elements, said method comprising the steps of:
    providing a hinge having first and second housing portions, said first housing portion having an aperture and said second housing portion having a first slot for receiving said flex strip;

providing a cylinder having a main cylinder portion and outer cylinder portions on each side of said main cylinder portion and having a second slot extending at least partially therethrough for receiving said conductor, said second slot having a first portion extending through one of said outer cylinder portions and said main cylinder portion at an angle with respect to a second portion extending though said main cylinder portion;

positioning a cylinder moveably within said aperture of said first housing portion, said cylinder having a second slot extending at least partially therethrough for receiving said flex strip;

routing said flex strip having a first portion extending longitudinally into said cylinder and a second portion extending laterally through said second slot;

extending said second portion of said flex strip laterally through said first slot; and retaining said cylinder in a substantially fixed position relative to said second housing portion with said flex strip.

11. The method for routing conductors of claim 10 wherein said step of positioning a cylinder comprises positioning said main cylinder portion within said aperture and said outer cylinder portions located on each side of said main cylinder portion within said hinge.

12. The method for routing conductors of claim 11 wherein said step of inserting said flex strip comprises positioning said flex strip within a hollow region of said cylinder.

13. The method for routing conductors of claim 12 wherein said step of inserting said second portion of said flex strip comprises aligning said second slot and said first slot.

14. A method for routing a flex strip between moveable housing elements of a wireless communication device, said method comprising the steps of:

providing a hinge having first and second intermatable hinge portions associated with said moveable housing elements, said first hinge portion having an aperture and said second hinge portion having a first slot for receiving said flex strip;

providing a cylinder having a main cylinder portion and outer cylinder portions on each side of said main cylinder portion and having a second slot extending at least partially therethrough for receiving said conductor, said second slot having a first portion extending through one of said outer cylinder portions and said main cylinder portion at an angle with respect to a second portion extending though said main cylinder portion;

positioning a cylinder moveably within said aperture of said first hinge portion, said cylinder having a second slot extending at least partially therethrough for receiving said flex strip;

inserting said flex strip having a first portion extending longitudinally into a hollow region of said cylinder and a second portion extending laterally through said second slot;

aligning said second slot and said first slot;

extending said second portion of said flex strip through said first slot; and retaining said cylinder in a substantially fixed position relative to said second hinge portion with said flex strip.

15. A method for assembling moveable housing elements, said method comprising the steps of:

providing a first hinge portion having an aperture and a second hinge portion having a first slot for receiving said conductor;

providing a cylinder having a main cylinder portion and outer cylinder portions on each side of said main cylinder portion and having a second slot extending at least partially therethrough for receiving said conductor, said second slot having a first portion extending through one of said outer cylinder portions and said main cylinder portion at an angle with respect to a second portion extending though said main cylinder portion;

inserting said conductor longitudinally into a cylinder, said cylinder having a second slot extending at least partially therethrough for receiving said conductor;

positioning said cylinder moveably within said aperture of said first hinge portion;

extending said conductor laterally through said second slot and said first slot; and retaining said cylinder in a substantially fixed position relative to said second hinge portion with said conductor.

16. The method for assembling movable housing elements of claim 15 wherein said step of positioning said cylinder comprises positioning a main cylinder portion within said aperture and positioning said outer cylinder portions on each side of said main cylinder portion within said first hinge portion.

* * * * *